June 28, 1932.   J. H. O'NEIL   1,865,384
AUTOMATIC CAN TESTING MACHINE
Filed Oct. 16, 1931   5 Sheets-Sheet 1

INVENTOR
James H. O'Neil
BY
Sturtevant, Mason & Baker
ATTORNEYS

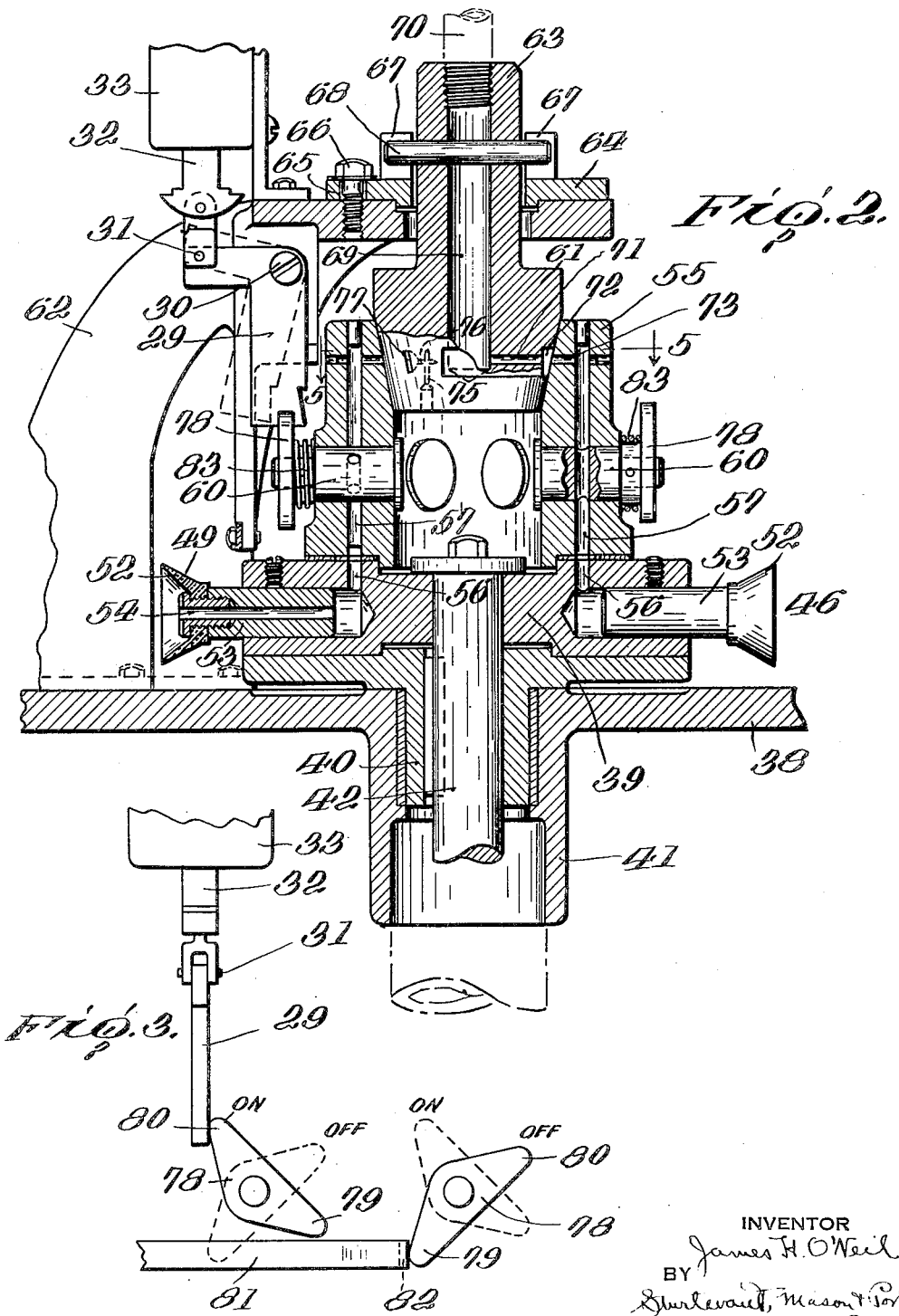

June 28, 1932. J. H. O'NEIL 1,865,384
AUTOMATIC CAN TESTING MACHINE.
Filed Oct. 16, 1931 5 Sheets-Sheet 4
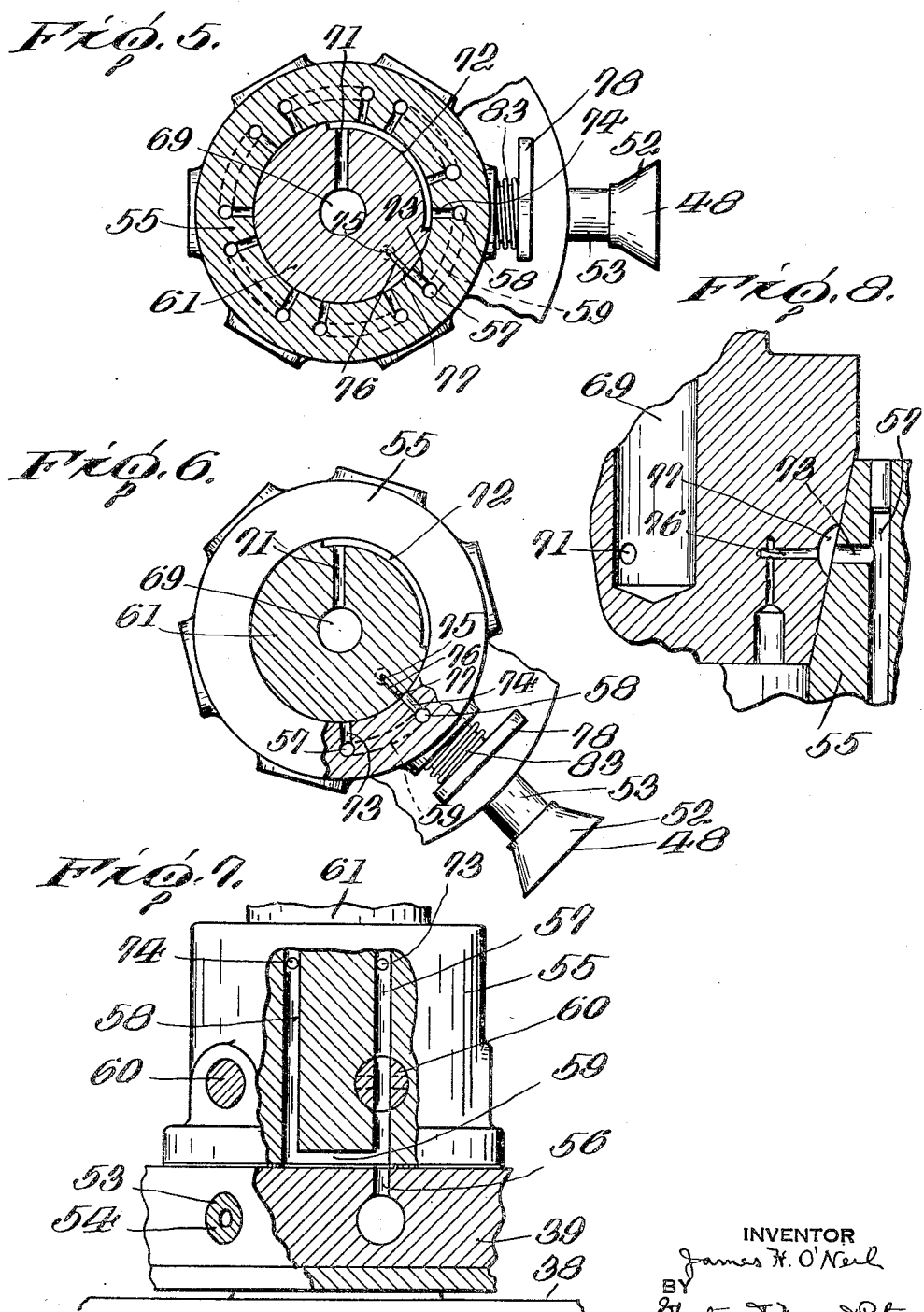
INVENTOR
James H. O'Neil
BY
Sturtevant, Mason, Porter
ATTORNEYS

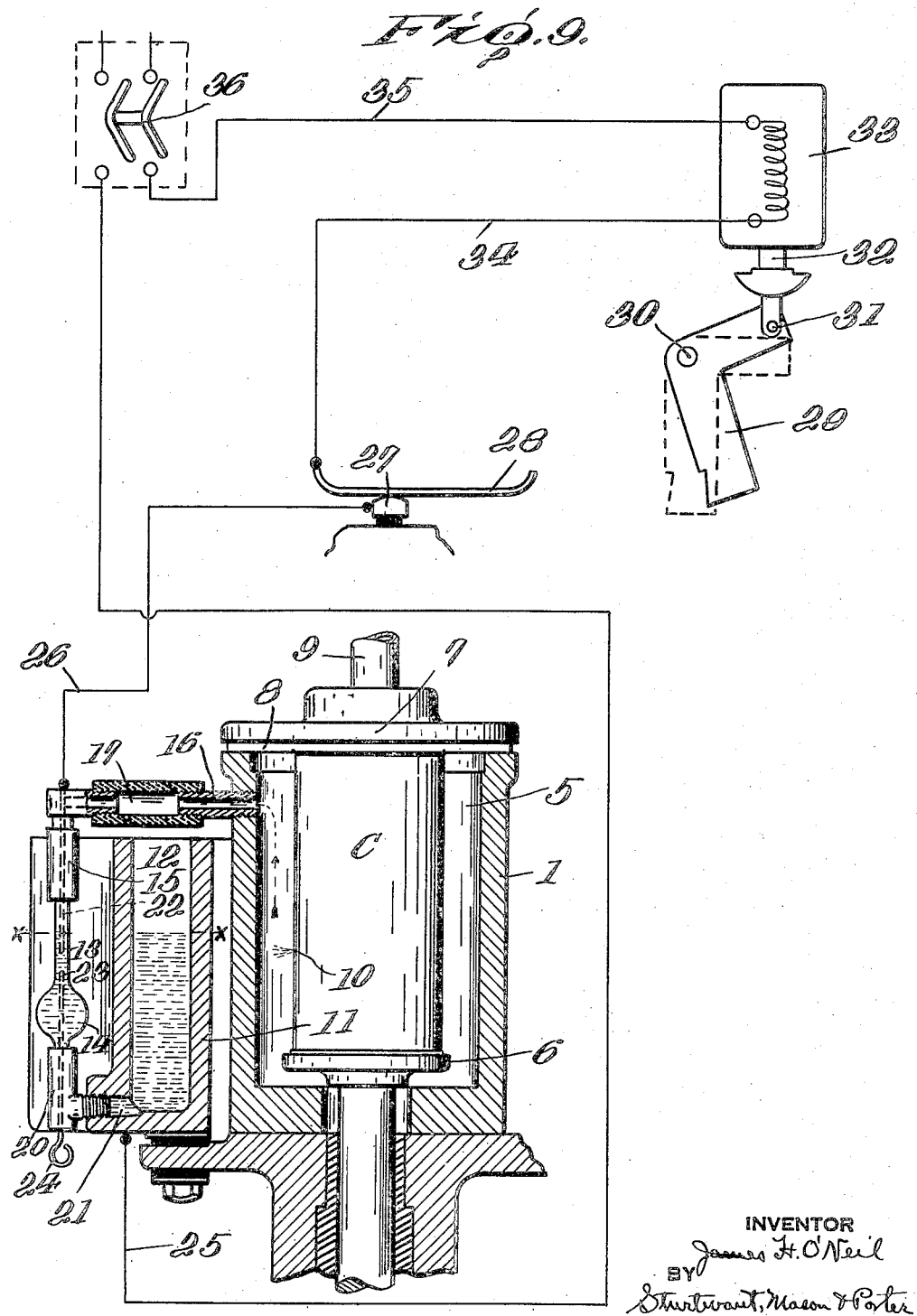

Patented June 28, 1932

1,865,384

UNITED STATES PATENT OFFICE

JAMES H. O'NEIL, OF SYRACUSE, NEW YORK, ASSIGNOR TO CONTINENTAL CAN COMPANY, INC., OF NEW YORK, N. Y., A CORPORATION OF NEW YORK

AUTOMATIC CAN TESTING MACHINE

Application filed October 16, 1931. Serial No. 569,386.

The invention relates to new and useful improvements in an automatic can testing machine for separating imperfect or leaky cans from perfect cans. In Patent No. 1,815,523, granted James H. O'Neil, July 21, 1931, an automatic can testing machine is described wherein there are a series of testing units, each of which receives a can and tests are made for leaks while the testing units are traveling. Associated with each testing unit is a water column controlling an electric circuit which operates in turn to control an ejecting means for ejecting the leaky cans at a different point in the travel of the testing units from that where the perfect cans are discharged from said units. The present invention has to do with an improvement in a machine of the type disclosed in said patent.

An object of the invention is to provide a separating mechanism which is associated with the traveling can testing units through which all of the cans being tested are discharged, and wherein said separating mechanism is provided with means controlled by the testing units for selectively discharging the leaky cans from said separating mechanism at a different point from the discharge of the perfect cans.

A further object of the invention is to provide a separating mechanism of the above type wherein a series of traveling suction cups operate in succession on the cans being tested, and said cups are so controlled by the testing units as to selectively discharge the leaky cans at a different point from the discharge of the perfect cans.

A still further object of the invention is to provide a separating mechanism for a can testing machine of the above type wherein a series of traveling suction cups engage the cans in succession in the testing units, and remove the cans from said testing units, discharging the leaky cans at one point and the perfect cans at another.

These and other objects will in part be obvious and will in part be hereinafter more fully disclosed.

In the drawings—

Fig. 2 is a sectional view on the line 2—2 of Fig. 1, through the separating mechanism;

Fig. 3 is a view showing diagrammatically the means for operating the control valve associated with each suction cup;

Fig. 5 is a sectional view on the line 5—5 of Fig. 2, showing the position of the valve at the time when the leaky cans are released;

Fig. 6 is a view partly in section and partly in plan showing the position of the valve at the time when the perfect cans are released;

Fig. 7 is a view partly in side elevation and partly in section showing the arrangement of the ports leading to each suction cup;

Fig. 8 is a vertical sectional view through a portion of the valve and the traveling carrier for the cups showing the position of the ports when vented to the atmosphere, and Fig. 9 is a view partly in section and partly in diagram showing the testing units for the cans and the control for the valve of the take-away.

The automatic testing machine to which the invention is applied includes a series of testing units, each of which includes a chamber adapted to receive a single can for the testing of the same. The can is placed in the chamber and the chamber closed, after which the can is put under air pressure. Connected with the chamber surrounding the can is means for forming a vertical water column. The upper end of the water column is connected through a closed passage in the chamber surrounding the can. The water column at its other end is connected to a reservoir which maintains a predetermined water column level when the chamber is open to the atmosphere. This water column, when at a predetermined height, establishes an electric circuit between two terminals, and when the water column is lowered through the increased pressure on the chamber surrounding the can, due to a leak in the can, then the circuit is broken. The electric circuit controls a solenoid which in turn controls a member for positioning a valve in the separating mechanism. The separating mechanism is in the form of a rotating turret carrying a series of suction cups. The turret rotates about a vertical axis, and each cup in turn engages a can in a testing unit after it has been lifted from the testing chamber. Associated with each cup are two ports leading to a vacuum creating mechanism. One of these ports contains the valve which has just been referred to. The valve is so positioned that the port is normally open, and when the port is open. the suction cup is put under a greater degree of suction than when the port is closed. When a perfect can is tested, the valve remains open, and as the cup engages the perfect can, it will carry it out of the testing unit and across an opening through which leaky or imperfect cans are discharged, and discharge the can at another point, due to the fact that the vacuum is closed on the ports and the ports make connection with a vent leading to the atmosphere. While passing over the opening, the suction cup is in full force and carries the perfect cans across the opening. In case of a leak, the circuit is broken, and the valve, through a control mechanism, is closed, thus closing off one of the ports leading to the suction cup. The other is active so as to cause the cup to remove the can from the testing unit. When the cup reaches the point so that the can is over the opening in the table, then the port creating the vacuum on the cup has been closed to the vacuum system and is open to the atmosphere through the vent so that the can is released and is discharged through the opening.

Figure 1:
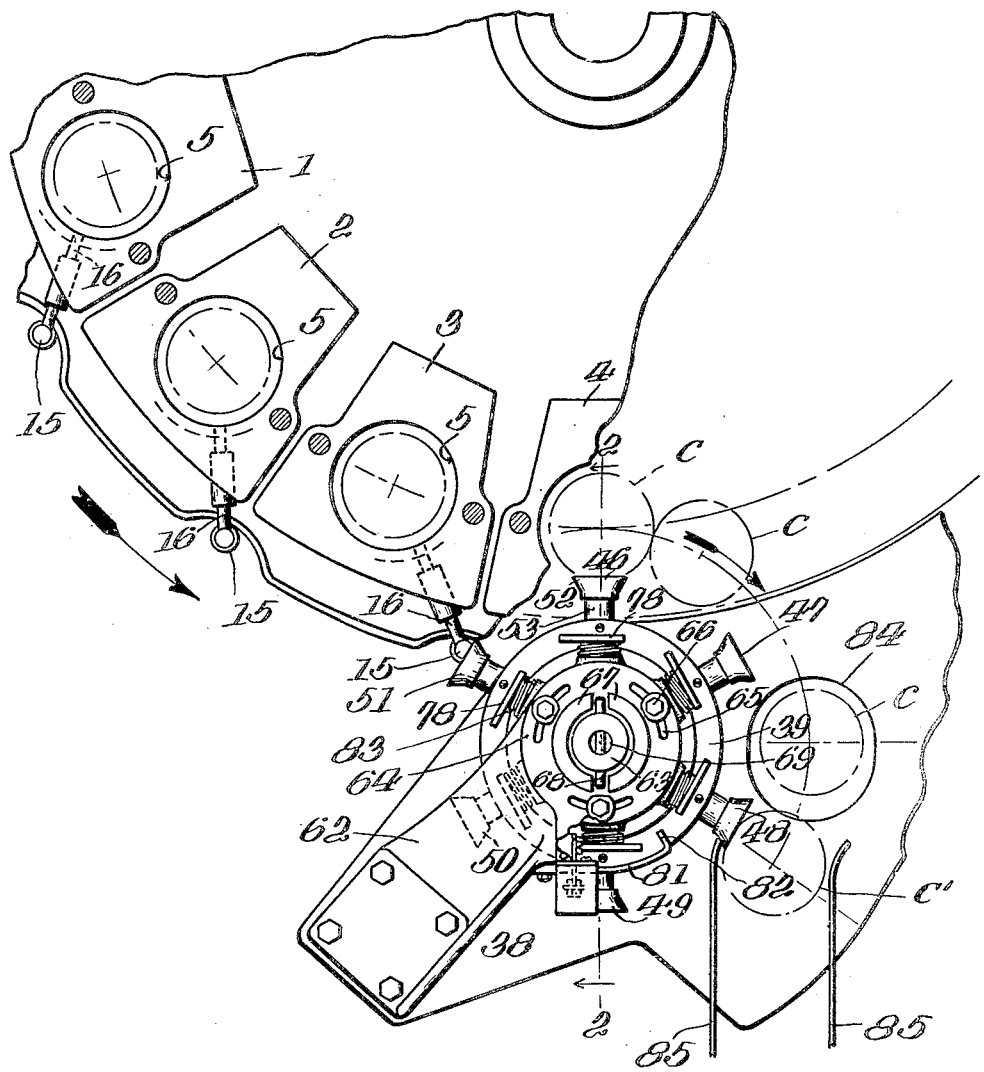
Figure 1 is a plan view of the separating mechanism, also showing more or less diagrammatically a portion of a testing machine with which it is associated.
Figure 4:
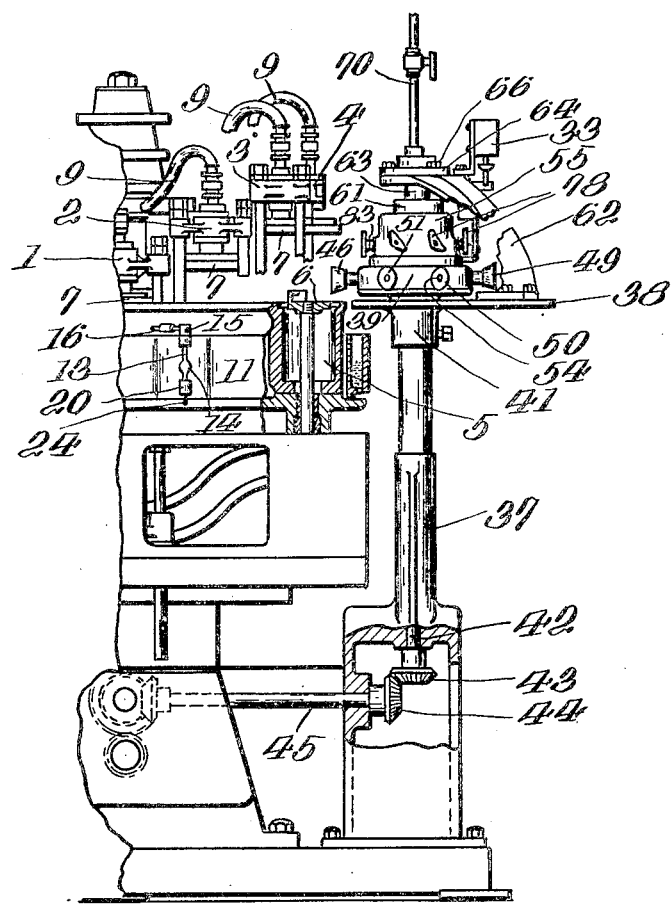
Fig. 4 is a view partly in side elevation and partly in section showing a portion of the testing machine and showing the means for actuating the separating mechanism.

The invention will possibly be better understood by a more detail description of the illustrated embodiment thereof. In Fig. 1 only a portion of the testing machine is shown and the parts thereof are diagrammatically illustrated. There is shown in this figure of the drawings, four testing units, 1, 2, 3 and 4. Each testing unit is provided with a chamber 5, shown more in detail in Fig. 9. The can to be tested is indicated at C. It is placed on a support 6 and lowered into the chamber and the chamber is closed by means of a cover plate 7 having an elastic pad 8 on its under face. When the elastic pad 8 carried by the cover plate contacts with the upper edge of the casing 1 forming the chamber 5, it also contacts with the upper end of the can C, closing the can. The can and the chamber 5 are thus closed at atmospheric pressure. Leading from each cover plate is a pipe 9 through which air may be passed to the can C for placing the can under air pressure. It is understood that there are a series of these testing units, and the cans are placed in the chambers one after another, the chambers closed, and the can put under air pressure. If there is a leak in the can as indicated at 10 in Fig. 9 of the drawings, the air forcing through the leak will change the pressure on the chamber 5, raising said pressure above atmospheric pressure.

Traveling with the testing units is a casing 11 forming a reservoir 12 which is open to the atmosphere. Associated with each chamber 5 is a tube 13 which is preferably transparent. The tube is provided with a bulb section 14. The upper end of the tube is connected to a member 15 which in turn is connected to a pipe 16 threaded into the wall of the chamber 5, and thus forming a port 17 leading from the chamber 5 to the tube 13. There is a pipe section 20 connected to the lower end of the tube 13, and said pipe section 20 is connected to the casing 11. A port 21 leads from the reservoir 12 and connects with the tube 13. The reservoir is provided with water, filling the same substantially to the line $x-x$. When the chamber 5 is open to the atmosphere, then the water will seek a level on the line $x-x$ in the tube 13. When the chamber 5 is under pressure, due to a leak in the can, then the increased pressure through the port 19 on the upper end of the water column will depress the water column in the tube 13.

In the tube 13 are two wires 22 and 23. The ends of these wires are spaced from each other. The wire 23 is provided with a handle portion 24 by which it may be adjusted in the tube to vary the distance between the wires. The wire 23 is connected with a casing with which a circuit wire 25 is connected. The wire 22 is insulated from the casing, and is connected to a circuit wire 26. The circuit wire 26 is connected with a contact member 27, associated with and traveling with the casing 1 forming the testing chamber 5. Mounted at a fixed position on the frame of the testing machine is a contact plate 28. As the testing units travel, the contact member 27 associated therewith will make contact in succession with this contact plate 28.

Cooperating with the testing units is a separating mechanism. This separating mechanism is controlled by a trip lever which is indicated at 29 in Fig. 9. The trip lever is pivoted at 30 and is connected at 31 with core 32 of a solenoid 33. One terminal of the solenoid is connected through a wire 34 with the contact plate 8 and the other terminal of the solenoid is connected by a wire 35 to a switch 36. The wire 25 is also connected to this switch. When this switch is closed, then a source of current is supplied to the machine. As each contact member 27 engages the contact plate 28 and moves along the same, a circuit is established in the solenoid, provided the water column is at a sufficient height to establish a circuit between the wires 22 and 23.

When a perfect can is placed in the chamber, the chamber closed and the can put under air pressure, there is no change in the pressure on the chamber 5 and no shifting of the water column, so that the circuit remains closed, and the solenoid will be energized, moving the trip lever to the full line position in Fig. 9. When, however, there is a leaky can, then the pressure on the chamber 5 will be increased, thus forcing the water column down until the circuit between the wires 22 and 23 is broken. At this time, the contact member 27 does not establish a current in the solenoid, and the trip lever will remain in the broken line position.

The separating mechanism is mounted in a supporting standard 37. At the upper end of the standard is a supporting plate 38 which is substantially on the same level as the upper face of the can support 6 when it is raised from the chamber 5 after the can has been tested, so that the can is ready for discharge from the testing unit. Mounted for rotation above the plate 38 is a turret 39. Said turret has a depending sleeve 40 turning in a suitable bearing in a depending hub 41 carried by the supporting plate 38 and engaging the upper end of the standard 37. A shaft 42 extends up through the standard and is connected to the turret for rotating the same. This shaft carries a bevel gear 43 at its lower end which meshes with a bevel gear 44 carried by a shaft 45 which in turn is provided with a gear meshing with a gear in the actuating mechanism for the testing machine. When the testing machine is actuated, the turret will be rotated in timing therewith.

The turret is provided with a series of suction devices 46, 47, 48, 49, 50 and 51. Each suction device includes a flexible cup 52 attached to a tube 53 adjustably secured in the turret. There is a port 54 leading from the cup through the tube to the recess at the inner end of the tube.

Mounted on the turret in fixed relation thereto is an upper section 55. There is a vertical port 56 leading upwardly from the recess at the inner end of each tube 53. This port 56 is in line with a port 57 in the upper section 55 of the turret. There is a second port 58 parallel with the port 57 and preferably spaced therefrom, about forty-five degrees. There is a cross port 59 connecting the ports 57 and 58. The upper ends of the ports 57 and 58 are plugged. In the port 57 is a valve 60 which has a port therethrough, so that when the valve is in one position, the port 57 is wide open, and when the valve is turned through an angle of ninety degrees, the port 57 is closed from the upper end thereof. There are, of course, ports 57 and 58 with the cross port 59 and the valve 60 associated with each suction cup.

Extending downwardly into the upper section of the rotating turret is a tapered head 61 which is stationary, and this tapered head is mounted in the outer end of an overhanging bracket 62 which is attached to the supporting plate 38. There is an opening through the outer end of this overhanging bracket, and the head 61 carries a stem 63 which extends through the opening, but does not contact therewith. Secured to the upper face of the bracket 62 is an adjustable plate 64. Said plate is provided with arcuate slots 65 and a clamping bolt 66 passes through each slot and is threaded into the bracket so that the plate 64 can be angularly adjusted on the bracket. The stem 63 passes freely through the opening in this plate 64. In the upper face of the plate 64 are spaced lugs 67, 67 which are rigid with the plate 64. A cross pin 68 passes through the stem 63 and lies between these lugs 67, 67. This prevents the cross head 61 from turning, but allows it to float and shift, if necessary, so as to make an easy contact with the upper end of the rotating turret. Extending down through the stem 63 and the head 61 is a passageway 69. A pipe 70 threaded into the upper end of the stem 63 leads to a suitable vacuum creating mechanism for drawing a vacuum on the recess port 69.

Extending radially of the head 61 is a port 71 which leads from the recess 69 to the outer face of the head 61. Extending circumferentially along the surface of the head 61 is a port 72. Adjacent the upper end of the port 57 is a horizontal port 73 which, at times, connects with the circumferential port 72. Adjacent the upper end of the port 58 is a horizontal port 74 which also, at times, connects with the port 72. The head 61 is provided with a vertically extending port 75 which connects with a radial port 76 leading to a relatively small recess 77 in the face of the head 61. This port 75 communicates with the atmosphere. The ports 74 and 73 during each rotation of the turret will communicate with this recess 77 and thus be vented to the atmosphere.

Each valve 60 projects outwardly from the rotating turret, and is provided with an operating head 78. This operating head is provided with two arms 79 and 80. Located in the path of travel of the valve head is an arm 81 having the end 82 thereof bent so as to lie in the path of travel of the valve head. Surrounding the stem of each valve is a spring 83 which aids in retaining the valve on its seat and permits it to be turned from one set position to another.

The testing unit 1 is at a position in the travel of the testing units, where the testing of the can has been completed and the contact member 27 is passing beneath the contact plate 28. If the can is a perfect can, then the circuit is completed, the solenoid energized, and the trip lever 29 swung to the full line position shown in Fig. 9, and in this position of the trip lever, the valve will pass the same without engaging the trip lever. The turret rotates in a clockwise direction as viewed in Fig. 1, and prior to the valve passing this trip lever, the valve engages the end 82 of the arm 81 and the valve is turned thereby to the "on" position as shown in Fig. 3. At this time, the valve is open. Inasmuch as the trip lever is swung out of the way of the valve head, it will remain in open position. When the valve is in open position, both the ports 57 and 58 are wide open, and as they reach the circumferential port 72 connected with the source of vacuum, the cup will be placed under vacuum and to an extent determined by the size of these two ports. The cup 49, as shown in Fig. 1, is the cup which engages the can in the testing unit 1. The can tested, as noted, was a perfect can, and when this suction cup 49 comes into contact with the can, both ports are open, and the can will be held against the cup through the suction pull of both ports. As the turret travels, the can is conveyed out of the testing unit and across the supporting plate 38. There is a hole or opening 84 through this supporting plate 38 through which imperfect cans are discharged. The suction cup with the pull of the two suction ports thereon, will carry the can across this opening 84 to the position C' indicated by the broken lines in Fig. 1. The advance port 58 crosses the recess 73, thus venting slightly the ports leading to the suction cup. At this time, however, the port 57 is connected with the port 72, and the reduction of the suction pull of the vacuum creating mechanism is not sufficient to release a can. The continued rotation of the turret, however, carries the port 57 away from the port 72, thus cutting off the suction pull, and when the port 73 reaches the recess 77, then the suction cup will be open to the atmosphere, and the perfect can carried thereby dropped and discharged between the guides 85, 85 of the canway discharge that is to receive the perfect cans.

From the above it will be apparent that when a perfect can is tested, the circuit controlled by the water column is maintained, the solenoid is energized, and the trip lever thrown out so that the valve remains open. Both suction ports are effective on the cup, causing the cup to firmly grip the can, carry the can from the testing unit across the opening 84 and discharge the can only after the two ports have been disconnected from the suction creating port 72 and connected with the recess leading to the atmosphere. At this time the can will be received by the guides 85, 85, and classed or discharged with the perfect cans.

If the can being tested at the unit 1 is imperfect or leaky, then the increased air pressure on the chamber 5 will shift the water column so as to break the circuit between the wires 22 and 23. The solenoid then will not be energized when the contact member 27 passes along the contact plate 28. The trip lever 29 will move to the broken line position in Fig. 9. The valve head will now engage the trip lever after it passes the end 82 of the arm 81. This will cause the trip lever to turn to the broken line position in Fig. 3. This is the "off" position, or the position where the valve is closed. The port 57 is now closed, and the only vacuum created on the cup when the port 72 is reached, is the vacuum which is created through the port 58. This is a sufficient vacuum, however, to cause the cup 49 to engage the can in the testing unit 1 and to remove it from the testing unit. The can is carried across the plate 38, and when it is directly over the opening 84, the port 74 leading from the port 58 registers with the recess 77. This connects the suction cup to the atmosphere, and the can is released so that it drops through the opening 84.

It is understood that the suction cup 51 will engage the can in the testing unit 3; the suction cup 50 will engage a can in the testing unit 2, and the suction cup 49 then engages the can in the testing unit 1. In other words, the suction cups engage the cans in succession in the traveling testing units. The suction cups operate on every can, whether it is perfect or imperfect. The suction of the cup, however, is so controlled through a water circuit that perfect cans are carried across the opening 84 and discharged at one point, while the imperfect cans are carried across the supporting plate 38 and discharged through the opening 84. Thus it is that the suction cups are caused to selectively discharge the leaky cans at a different point from the discharge of the perfect cans.

It is obvious that minor changes in the details of construction and the arrangement of the parts may be made without departing from the spirit of the invention as set forth in the appended claims.

Having thus described the invention, what I claim as new and desire to secure by Letters Patent, is—

1. A machine for testing cans for leaks comprising a series of traveling testing units, a separating mechanism associated therewith through which all the cans being tested are discharged, said separating mechanism including a series of traveling suction cups operating in succession on the cans being tested, and means controlled by the testing units for causing said cups to selectively discharge the leaky cans at a different point from the discharge of the perfect cans.

2. A machine for testing cans for leaks comprising a series of traveling testing units, a separating mechanism associated therewith through which all the cans being tested are discharged, said separating mechanism including a series of traveling suction cups operating in succession on the cans being tested, means controlled by the testing units for placing said cups under one degree of suction for the leaky cans and another degree of suction for the perfect cans, whereby said cups operate to withdraw the cans from the testing unit and discharge the leaky cans at a different point from the discharge of the perfect cans.

3. A machine for testing cans for leaks comprising a series of traveling testing units, a separating mechanism associated therewith through which all the cans being tested are discharged, said separating mechanism including a series of traveling suction cups operating in succession on the cans being tested, electrical means operated by the testing units for varying the degree of suction on the cups whereby said cups operate to remove the cans from the testing units and selectively discharge the leaky cans at a different point from the discharge of the perfect cans.

4. A machine for testing cans for leaks comprising a series of traveling testing units, a separating mechanism associated therewith through which all the cans being tested are discharged, said separating mechanism including a series of traveling suction cups operating in succession on the cans being tested, a suction mechanism for placing said cups intermittently under suction including a valve-controlled port for varying the degree of suction, means controlled by the testing units for closing the valve to decrease the suction on the cup when the can engaged thereby is a leaky can, and means for venting the cup so as to discharge the leaky can at a different point from the discharge of the perfect cans.

5. A machine for testing cans for leaks comprising a series of traveling testing units, a separating mechanism associated therewith through which all the cans being tested are discharged, said separating mechanism including a horizontally rotating turret carrying a series of suction cups operating in succession on the cans being tested, means controlled by the testing units for causing the cups to remove all of the cans from the testing units, and to selectively discharge the leaky cans at a different point from the discharge of the perfect cans.

6. A machine for testing cans for leaks comprising a series of traveling testing units, a separating mechanism associated therewith through which all the cans being tested are discharged, said separating mechanism including a horizontally rotating turret carrying a series of suction cups operating in succession on the cans being tested, mechanism for intermittently placing said suction cups under suction, and means controlled by the testing units for varying the suction on said cups for selectively discharging the leaky cans at a different point from the discharge of the perfect cans.

7. A machine for testing cans for leaks comprising a series of traveling testing units, a separating mechanism associated therewith through which all the cans being tested are discharged, said separating mechanism including a horizontally rotating turret carrying a series of suction cups operating in succession on the cans being tested, mechanism for placing said cups intermittently under suction including a valve for controlling the degree of suction on the cup, and means controlled by the testing units for operating said valve to selectively discharge the leaky cans at a different point from the discharge of the perfect cans.

8. A machine for testing cans for leaks comprising a series of traveling testing units, a separating mechanism associated therewith through which all the cans being tested are discharged, said separating mechanism including a horizontally rotating turret carrying a series of suction cups operating in succession on the cans being tested, mechanism for placing said cups intermittently under suction including a valve for controlling the degree of suction on the cup, electrically controlled means for closing said valve for decreasing the degree of suction on the cup engaging a leaky can for discharging the leaky can at a different point from the discharge of the perfect can.

9. A machine for testing cans for leaks comprising a series of traveling testing units, a separating mechanism associated therewith through which all the cans being tested are discharged, said separating mechanism including a rotating turret having a series of suction cups operating in succession on the cans being tested, a suction creating means including ports for intermittently controlling the suction on the cups, said cups being under suction when contacting with each can for conveying the can from the testing unit, and means controlled by the testing units for varying the degree of suction on the cups for selectively discharging the leaky cans at a different point from the discharge of the perfect cans.

10. A machine for testing cans for leaks comprising a series of traveling testing units, a separating mechanism associated therewith through which all the cans being tested are discharged, said separating mechanism including a horizontally rotating turret having a series of suction cups operating in succession on the cans being tested, suction mechanism for placing the cups under suction prior to contacting with the cans, including a valve-controlled port leading to the cup, a port bypassing the valve whereby said cups are under suction when the valve is closed so that the cans are removed from the testing units by the traveling cups, and means controlled by the testing units for closing the valve when a leaky can is to be engaged by the cup for selectively discharging the leaky cans at a different point from the discharge of the perfect cans.

11. A machine for testing cans for leaks comprising a series of traveling testing units, a separating mechanism associated therewith through which all the cans being tested are discharged, said separating mechanism including a horizontally rotating turret having a series of suction cups operating in succession on the cans being tested, suction mechanism for placing the cups under suction prior to contacting with the cans, including a valve-controlled port leading to the cup, a port by-passing the valve whereby said cups are under suction when the valve is closed so that the cans are removed from the testing units by the traveling cups, means controlled by the testing units for closing the valve when a leaky can is to be engaged by the cup, and a vent for the cup disposed relative to the control of the suction mechanism so as to release the leaky can at a different point from the discharge of the perfect can.

In testimony whereof, I affix my signature.

JAMES H. O'NEIL.